(12) United States Patent
Taymourian et al.

(10) Patent No.: US 6,716,293 B2
(45) Date of Patent: Apr. 6, 2004

(54) WALLBOARD WITH FLY ASH (75) Inventors: Kamran Taymourian, Fort Collins, CO (US); Richard P. Squire, Golden, CO (US)

(73) Assignee: Sper-Tech LLC, Golden, CO (US)

( * ) Notice: Subject to any disclaimer, the term of this patent is extended or adjusted under 35 U.S.C. 154(b) by 0 days.

(21) Appl. No.: 09/944,033

(22) Filed: Aug. 30, 2001

(65) Prior Publication Data

US 2003/0054157 A1 Mar. 20, 2003

(51) Int. Cl.$^7$ .......................... B32B 13/04; C04B 14/36; C04B 18/06
(52) U.S. Cl. .......................... 156/39; 156/43; 106/405; 106/705; 106/DIG. 1; 264/36.2
(58) Field of Search .............................. 156/39, 43, 45; 264/36.18, 36.2, DIG. 49, DIG. 43, 42, 333; 106/DIG. 1, 705

(56) References Cited

U.S. PATENT DOCUMENTS

| | | | |
|---|---|---|---|
| 3,700,470 A | * 10/1972 | Barton | 264/333 |
| 3,804,706 A | 4/1974 | Kurashige et al. | 162/109 |
| 4,551,384 A | * 11/1985 | Aston et al. | 156/78 |
| 4,586,958 A | 5/1986 | Matsuura et al. | 106/15.05 |
| 4,659,385 A | * 4/1987 | Costopoulos et al. | 106/87 |
| 4,812,169 A | 3/1989 | Matsuura et al. | 106/15.05 |
| 4,842,786 A | * 6/1989 | Betzner | 264/40.1 |
| 5,393,794 A | 2/1995 | Sperber | 521/78 |
| 5,534,058 A | 7/1996 | Strabala | 106/708 |
| 5,622,556 A | * 4/1997 | Shulman | 106/677 |
| 5,658,624 A | * 8/1997 | Anderson et al. | 428/34.7 |

* cited by examiner

Primary Examiner—Jeff H. Aftergut
Assistant Examiner—Todd J. Kilkenny
(74) Attorney, Agent, or Firm—Sheridan Ross P.C.

(57) ABSTRACT

A composition used in making wallboard is provided. The composition requires at least fly ash, water and a first binder. The composition is located between two members that together form the wallboard. In one embodiment, at least the first binder is part of a foamable solution and part of a binder solution. In this embodiment, the fly ash, foamable solution and binder solution are combined in a mixer. The output of the mixer can be regulated based on detection of a magnitude related to viscosity of the composition. During the process for making the wallboard, the composition is sandwiched between the two members and subject to both preheating and subsequent heating stages. During the preheating, a sufficient number of bubbles associated with the binder are maintained in order to achieve a predetermined density based on the closed cells that are formed after the water evaporates. Additionally, any expansion during the subsequent heating step is controlled so that it is less than expansion of the composition during the preheating.

22 Claims, 3 Drawing Sheets

WALLBOARD WITH FLY ASH

FIELD OF THE INVENTION

The present invention relates to the use of fly ash to make building materials including wallboard.

BACKGROUND OF THE INVENTION

Fly ash that results from coal combustable products is a readily available commodity. Coal burning plants for generating electricity produce thousands of tons of fly ash. Disposal of the fly ash continues to be a major challenge. Because of its abundance and the difficultly in finding entities who want the fly ash, practical uses for the fly ash have been previously advanced for the purpose of expanding the market for fly ash Disclosures and proposals have been made for using fly ash as part of building materials including building blocks, panels, ceiling components, as well as building insulation.

Notwithstanding the efforts that have been made in the past towards increasing the use of fly ash, such as being part of building materials, the need remains to provide commercially acceptable wallboard that can be made with fly ash and which still has the requisite strength and density. Additionally, the wallboard with fly ash must be cost competitive including from the standpoint of developing a satisfactory process that can efficiently manufacture the wallboard.

SUMMARY OF THE INVENTION

In accordance with the present invention, wallboard is made from a composition that includes at least fly ash, water and a first binder. The wallboard has two members held on opposite sides of the composition. These two members are typically made from paper products and form the relatively rigid backing for the composition. The first binder may be subject to a foaming action in order to provide better surface interaction and adhesion between the first binder and the fly ash. In one embodiment, the first binder, in combination with at least some of the water, is caused to foam.

The wallboard can be characterized by its thickness. Traditionally, wallboard can have a one-half inch thickness and a five-eighths inch (fireproof or fire resistant) thickness. Regardless of which of these two thicknesses are employed, the amount of fly ash by weight is in the range of about 60%–66% and preferably about 63% by weight, the water is in the range of about 31%–37% and preferably about 34.5% by weight, and the first (or more than one) binder is in the range of about 1.8%–2.4% and preferably about 2.0% by weight. It should be understood that other materials could be part of the composition; however, each of the fly ash, the water and the binder remains in its respective range.

In a preferred embodiment, the first binder is part of a binder solution and there is a second binder that is part of a foam solution. In the most preferred embodiment, the first binder solution has about 5.75% polyvinyl alcohol (PVA) by weight and the foam solution has about 4.85% polyvinyl alcohol (PVA) by weight. Although it is not necessary that the second binder of the foam solution and the first binder of the first binder solution be the same, it is necessary that these two components be chemically compatible. It is also preferred that the first binder be different from polyvinyl acetate. In one embodiment, the composition includes a small amount of fiber material, such as being less than 1% by weight of the composition weight. Importantly, the composition must have a desired viscosity when the composition is initially disposed or located between the first and second members. The viscosity at that time is in the range of about 600,000 to about 1,500,000 (centipoise). Furthermore, the wallboard after being made using the composition has a strength of between about 80.0 to about 130.00 (lbs.) and a density between about 0.58 to about 0.79 (gm/ml) (36.20–49.30 lb./cu. ft.). The strength amount is based on use of an industry standard that can be identified as the "nail pull" test which measures the force necessary to push a standard nail through a wallboard having a specified thickness. The wallboard is also substantially homogeneous in that, for any cross-section thereof, an area of 0.1 square inch is essentially the same as any other area of 0.1 square inch.

With respect to making the composition, a first vessel or bin is utilized that contains the solid material(s), which include at least the fly ash. In one embodiment, such as wallboard with ⅝ inch thickness, the solid materials also include a fibrous material (e.g. glass fiber) in a minor amount. In preferred embodiment, a second vessel or bin houses the binder and a third vessel or bin holds the solution to be foamed, such as including a second binder which can be the same as the first binder. In this embodiment, the second binder can move or is transported from the third vessel to a foaming area such as a foaming nozzle that receives the second binder or other foamable substance (e.g., a sufficient amount of a foaming agent may be included), together with air that is introduced into the foaming nozzle. When these three vessels are utilized, their outputs are eventually received by a mixer for combining the binder solution having the first binder, the foamable solution having the second binder, together with the fly ash, as well as any other solid material that might be utilized.

The output of the mixer is input or sent to a wallboard forming subsystem that is utilized in joining the outer paper pieces or members to the composition, together with other steps or stages associated with making the wallboard.

With respect to controlling these operations, at least one control system is provided. The control system, whether it is a single system or includes a plurality of cooperating controllers, can be used to control the outputs from the vessels in connection with providing a homogenous composition having the desired viscosity output from the mixer. In that regard, the control system, in addition to including processing and regulating capabilities and functions, can include a viscosity metering device that monitors the viscosity of the composition output from the mixer. Depending on the determined, current value or magnitude of viscosity, the control system can control or regulate the inputs of solid material(s) and binders to the mixer. Such control can involve controlling the states, positions or activations of variously positioned pumps and/or valves, as well as feed mechanisms, such as an auger.

With further regard to the process for making the wallboard, after the composition is output by the mixer having the desired viscosity, it is input to the wallboard forming subsystem that can include a conveyor on which a first or lower member, preferably made of a paper material or the like, is located. A controlled portion of the composition can be continuously applied to this lower member, which portion was output by the mixer. It is preferred that the output of the mixer be adjacent to the conveyor, although such positioning is not necessary. As the composition over the first member is moved using the conveyor, it is evened or smoothed, typically applying desired pressure or a force. Then, a second or upper member is provided that overlies the composition. Subsequently, the combination of the two members and the composition therebetween can be subject to pre-heating and a further pressure applying step can be utilized. The preheating may be desirable to cause the materials to harden or set faster. However, it may be appropriate to utilize chemicals, agents or other additives that decrease the setting or hardening time and/or may provide greater strength. Preferably but not necessarily after any preheating stage, the combination of the composition and the two members are cut. The wallboard can be cut while it is on the conveyor, while the conveyor is moving or while it is stationary. The cut wallboard pieces or panels are also subject to a heating stage. After the heating stage, the wallboard is essentially a finished product.

It is noted that during the pre-heating stage, the composition includes bubbles that have been formed using at least the first binder. Maintaining a substantial number of such bubbles is important in order to achieve the desired density and strength of wallboard. Such bubbles result in stronger and more stable closed cells in the composition. To accomplish this, at least the first binder is involved with providing bubbles with a film of sufficient thickness so that they continue to hold air during the pre-heating and do not burst or otherwise fail to maintain a desired number of bubbles. During the pre-heating, at least a desired number, such as a majority, of the bubbles continue to hold air due to their sufficient thickness and the surrounding substances (e.g., hardening of the composition) so that the air cannot escape. Additionally, during the pre-heating, the composition expands to some degree over its volume before the pre-heating. This is expected and appropriate in connection with achieving desired wallboard density. However, it is important that any expansion during the subsequent heating stage be limited. That is, the expansion of the composition during the heating stage should be less than the expansion during the pre-heating.

In view of the foregoing summary, a number of salient features of the present invention are readily discerned. A wallboard composition is provided that includes substantial amounts of fly ash thereby making use of a material that is abundant and for which it is advantageous to find acceptable, productive uses thereof. The wallboard composition has critical ranges of fly ash, water and binder. These critical amounts by weight relate to providing the necessary viscosity of the composition prior to its being combined with the outer members that form the wallboard. The wallboard with the composition has a desired density and more than sufficient strength including satisfying appropriate building standards. In addition to the amounts of fly ash that must be utilized, a certain binder must be incorporated that provides a sufficient film or bubble wall thickness so that a proper wallboard density is achieved.

Additional advantages of the present invention will become readily apparent from the following discussion, particularly when taken together with the accompanying drawings.

DETAILED DESCRIPTION

Figure 1:
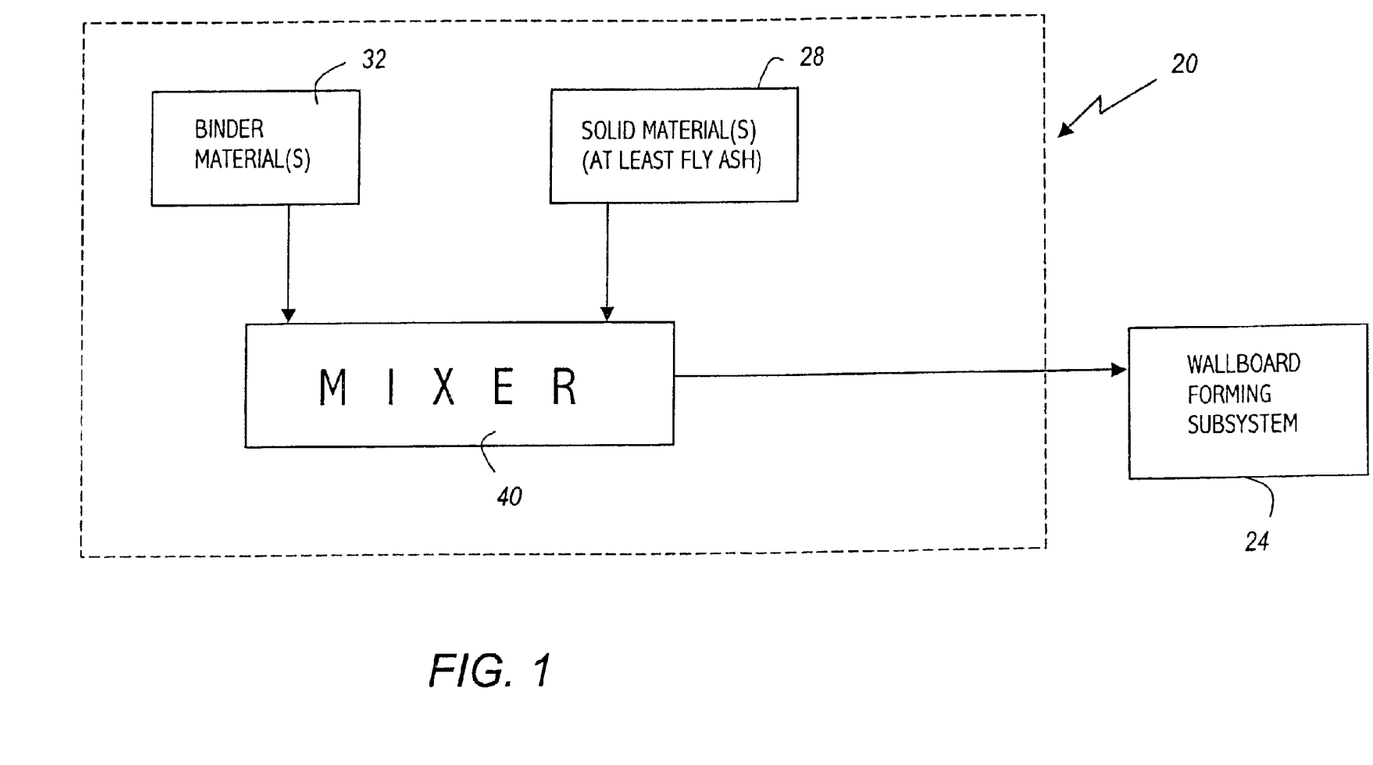
FIG. 1 is a block diagram of the composition forming subsystem and the wallboard forming subsystem of the present invention.

With reference to FIG. 1, a basic system is illustrated for making wallboard and includes a composition forming subsystem 20 and a wallboard forming subsystem 24. The composition forming subsystem 20 relates to making the composition that is to be located or sandwiched between two members. After the composition is provided using the composition forming subsystem 20, the composition is input to the wallboard forming subsystem 24 where it is combined with the two members that form the relatively rigid outer backing or panels of the wallboard.

In the general embodiment, the composition forming subsystem 20 includes a container 28 for holding solid material(s) including at least fly ash and a container 32 for holding binder material(s) including at least a first binder. In the preferred embodiment, the binder material(s) includes some water. Each of the solid material(s) container 28 and the binder material(s) container 32 provides an output to a mixer 40. The mixer 40 mixes or otherwise combines the materials used in producing the composition.

With respect to the materials or components of the composition, the fly ash has a small amount of the complex aluminum, silica, iron and calcium oxide molecule as well as calcium oxide. These molecules react with water and provide some strength in the finished product, such as wallboard. The fly ash can also have a pH value in the range of 10–12 that is taken into account since it affects the gellation (setting) of the composition. The higher pH value could be reduced, if desired, by acceptable one or more neutralizing agents. The fly ash has two main functions, namely as the fill material of the composition since it is essentially or substantially all the solid material and the fly ash also acts to provide insulation. For example, the fly ash is the most significant contributor in maintaining a desired temperature as part of the wallboard structure that constitutes the walls of a building.

The water in the composition functions as a solvent and a dilution product, as well as a reactant with the fly ash and the binder material(s). When the composition is made, the amount of water by weight is second only to the amount of fly ash by weight. The first binder is included in the composition to provide strength and adhesion for attaching the outer members or surface paper products to this composition or core material. In the preferred embodiment, the first binder is a polyvinyl alcohol (PVA) polymer that is soluble in water. Different grades of this polymer are commercially available with different physical and somewhat different chemical properties. Each has its particular mixing behavior. Even though polyvinyl alcohol (PVA) is preferred, any other binder with similar properties and abilities that can bond with the fly ash and provide a sufficiently strong composition can be used.

In one embodiment, a sufficient amount (e.g., less than 1% by weight of the composition) of a wetting/foaming agent may be utilized in the composition. This agent may provide better surface interaction and adhesion between at least the first binder in the fly ash, which results in greater strength. In the absence of the wetting/foaming agent, the finished product, such as the wallboard, might have lower physical properties since the binder molecules rather than binding to the fly ash particle surfaces will merely encapsulate and surround the particles, which is not the ideal situation. The wetting/foaming agent can also decrease the surface tension of the binder solution (at least the first binder and some water) for ease of foaming. Many conventional and well-known wetting/foaming agents might be utilized. Alternatively, not even this amount of foaming agent may be required. Suitable foaming may result from the mixing of the materials in the mixer 40 and without any foaming agent.

In a preferred embodiment, the foamable solution has some water and binder. The binder of the foamable solution can be defined as a second binder, which can be the same as the first binder or essentially equivalent thereto. It is preferred that the binder in the foamable solution be physically and chemically compatible with the first binder. In one embodiment, the second binder is also polyvinyl alcohol (PVA) and is less in concentration or weight in the foamable solution than the first binder that is part of the binder solution. In one embodiment, the polyvinyl alcohol (PVA) in the binder solution is about 5.75% by weight and the amount of the polyvinyl alcohol in the foamable solution is about 4.85% by weight.

Regarding the amounts of the materials in the composition, two slightly different formulations are noted, depending upon the thickness of the wallboard to be produced. For a standard one-half inch thick wallboard, the following components by weight percent are preferred, although different amounts may be provided as described later:

| Material | Percent by Weight |
| --- | --- |
| Fly Ash | 63.3 |
| Water | 34.7 |
| Binder | 2 |

When a standard five-eighths inch thick wallboard is produced and which has particular applicability in fire-proof or fire-resistant applications, the following components by weight percent make up the composition:

| Material | Percent by Weight |
| --- | --- |
| Fly Ash | 63.4 |
| Water | 34.1 |
| Binder | 2 |
| Glass Fiber | 0.5 |

Even though the optimum or most preferred formulations for the composition to be used for the wallboard are as noted above, the amounts of the materials can be changed and still provide an acceptable product. The ranges that can be used based on the above formulations are as follows. For ½" wallboard and ⅝" wallboard: the fly ash can be varied ±10% by weight; the water can be varied ±10% by weight and the binder can be varied +20%, −10% by weight and the fiber (when used with ⅝" wallboard) can vary ±10% by weight where, for each material or component that is varied within its range, the other materials/components set out in the above-formulations are held constant.

With the understanding that the formulations can be determined at all amounts within the ranges, examples of formulations at the high and low ends of the ranges are provided:

| Material | Percent Weight |
| --- | --- |
| (−10% Ash) for ½" wallboard | |
| Fly Ash | 60.8 |
| Water | 37 |
| Binder | 2.2 |
| (+10% Ash) for ½" wallboard | |
| Fly Ash | 65.5 |
| Water | 32.6 |
| Binder | 1.9 |
| (−10% Water) for ½" wallboard | |
| Fly Ash | 65.6 |
| Water | 32.3 |
| Binder | 2.1 |
| (+10% Water) for ½" wallboard | |
| Fly Ash | 61.2 |
| Water | 36.9 |
| Binder | 1.9 |
| (−10% Binder) for ½" wallboard | |
| Fly Ash | 63.4 |
| Water | 34.8 |
| Binder | 1.8 |
| (+20% Binder) for ½" wallboard | |
| Fly Ash | 63.0 |
| Water | 34.5 |
| Binder | 2.5 |
| (−10% Ash) for ⅝" wallboard | |
| Fly Ash | 60.9 |
| Water | 36.5 |
| Binder | 2.1 |
| Fiber Glass | 0.5 |
| (+10% Ash) for ⅝" wallboard | |
| Fly Ash | 65.6 |
| Water | 32.1 |
| Binder | 1.9 |
| Fiber Glass | 0.5 |
| (−10% Water) for ⅝" wallboard | |
| Fly Ash | 65.6 |
| Water | 31.8 |
| Binder | 2.1 |
| Fiber Glass | 0.5 |
| (+10% Water) for ⅝" wallboard | |
| Fly Ash | 61.3 |
| Water | 36.3 |
| Binder | 1.9 |
| Fiber Glass | 0.5 |
| (−10% Binder) for ⅝" wallboard | |
| Fly Ash | 63.5 |
| Water | 34.2 |
| Binder | 1.8 |
| Fiber Glass | 0.5 |
| (−20% Binder) for ⅝" wallboard | |
| Fly Ash | 63.1 |
| Water | 34.0 |
| Binder | 2.4 |
| Fiber Glass | 0.5 |
| (−10% Fiber) for ⅝" wallboard | |
| Fly Ash | 63.43 |
| Water | 34.12 |
| Binder | 2.0 |
| Fiber Glass | 0.45 |
| (+10% Fiber) for ⅝" wallboard | |
| Fly Ash | 63.37 |
| Water | 34.08 |
| Binder | 2.0 |
| Fiber Glass | 0.55 |

For one example related to the determination of the percent weight of a material being changed, the following determines the percent weights of the materials for a change of −10% for the fly ash for the ½" wallboard. Specifically, the optimum amount of fly ash is 63.3% by weight. Ten percent of 63.3% is 6.33%. Since this variation is −10%, the changed amount of fly ash is 63.3% minus 6.33% which equals 56.9%. This amount is added to the constant (optimum) amounts of water and binder for the ½" wallboard, namely, 34.7% for the water and 2.0% for the binder. These numbers (56.9, 34.7 and 2.0) are summed to 93.6%. Each of the amounts of 56.9, 34.7 and 2.0 are divided by the this sum (93.6) to determine the percent weight of all materials based on a −10% fly ash change for the ½" wallboard. This division results in the previously provided formulation, namely: fly ash 60.8% by weight, water 37% by weight and binder 2.2% by weight for the change of −10% fly ash (from the optimum÷weight) for the ½" wallboard.

In arriving at the low and high ends of these ranges, it was determined that, when the amount of fly ash is less than −10% of the optimum amount (63.3% by weight), the processing time is not satisfactory as the composition requires an unacceptable time to set or harden at such lower amounts of fly ash, with the other components being held constant. The composition also becomes lighter and the composition too readily escapes from between the paper or backing products or members when the pressing force is applied. When the amount of fly ash is greater than the 10% variation from the optimum amount, the force required to properly press the rigid backing members, with the composition therebetween, is too great. Additionally, the wallboard product, once formed, has an unacceptable weight. Regarding the binder, if the amount used is below the low end of the range, the binding properties are insufficient resulting in a weak wallboard product. When the amount of binder used is above the high end of its range, the resulting wallboard product is stronger but too expensive.

In arriving at this formulations, at least two important considerations are made related to the eventual strength of the wallboard and the processability of the particular composition. Product including wallboard strength is highly sensitive to the amount of the binder material(s). The processing or manufacturing steps are very sensitive to the amount of water, particularly related to facilitating the process and economic factors associated therewith since close to 95% of the water must be removed or be later evaporated from the composition.

Referring to combining the different materials, it is preferred that the foamable solution and the binder solution be mixed or combined first in the mixer 40 before the fly ash is included in the mixer 40. Alternatively, instead of a separate foamable solution and binder solution that are mixed together in the mixer 40, a relatively thin foam solution could be made to provide the desired density of product, such as wallboard, so that a thin foam solution that includes binder is input to the mixer 40 at the same time, or close in time, to the solid material(s) that includes at least fly ash. The correct amount of each component is delivered to the mixer 40 under proper control, such as by accurate metering and measuring of components. Any variation larger than the percentage value set out in the above-identified formulations in any of the components can cause an unwanted or major change in mix viscosity, homogeneity and solid material(s) dispersion. This can lead to unworkable manufacturing or processing steps involving the composition. Additionally, the physical properties of the finished product (e.g. wallboard) may not be acceptable. The mixing stage involving the mixer 40 has as a main objective to achieve a homogeneous and well-dispersed mix with a viscosity in the range of about 600,000 to 1,500,000 centipoises in a relatively short time. A mixing residence time of not more than 15 seconds appears desirable. The mixer 40 can be any mixer that properly combines the components, for example, a medium shear mixer, a high speed ribbon mixer, a pin mixer, a screw mixer, etc. Since fly ash is very abrasive, selection of the mixer 40 should include a consideration of the wear and maintenance due to this abrasive material. Temperature during the mixing stage is also taken into account. Noticeably improved results are achieved when the components are at about 65° F. (+−5°). Colder material temperature slows the gelling and setting of the composition. Higher temperatures lower the viscosity at first and cause sudden gelation later, which can cause serious processing problems. The degree of mixing should not increase the mixed temperature to cause premature gelling.

Figure 2:
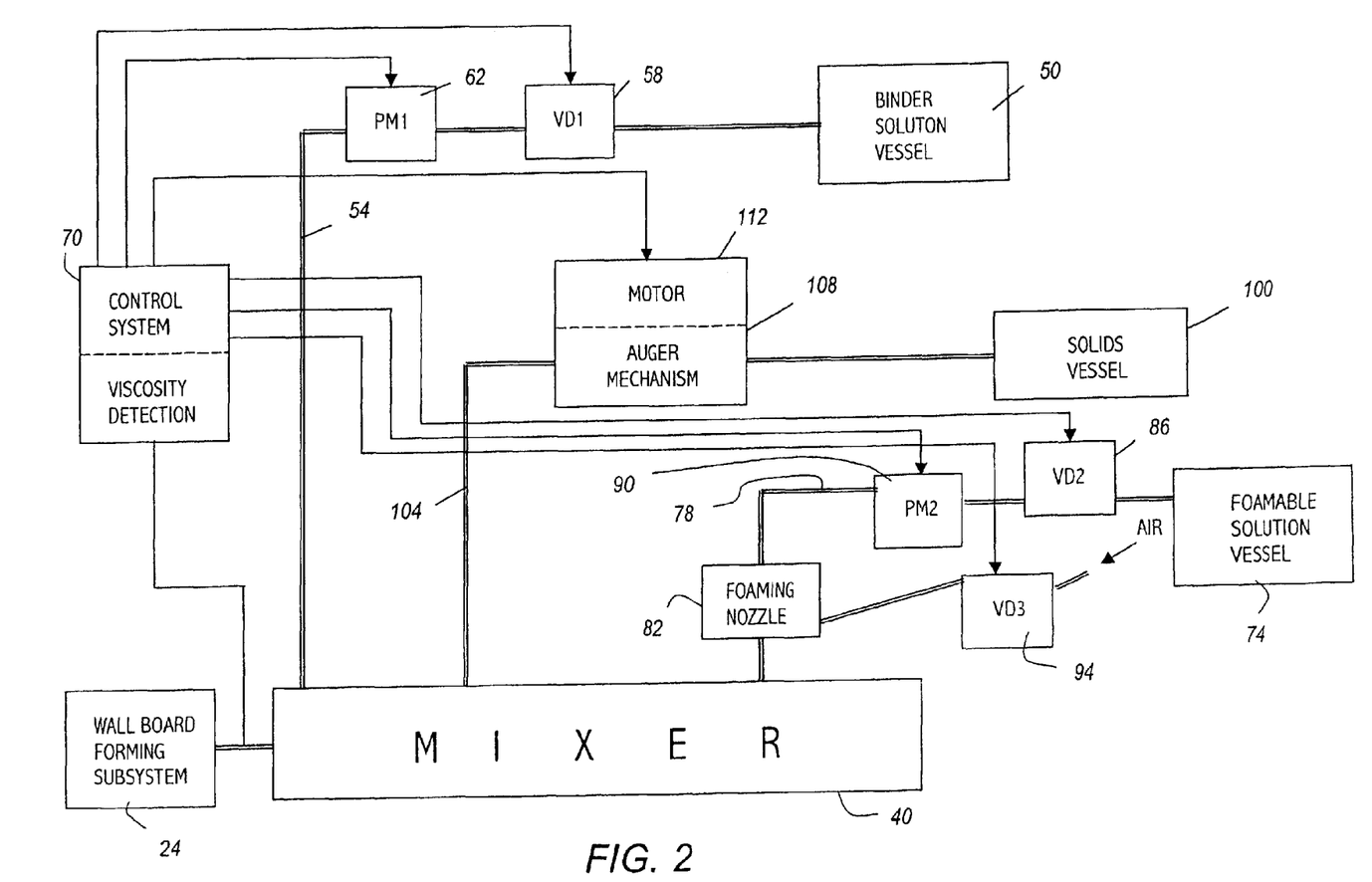
FIG. 2 is a block diagram illustrating major components and subsystems of one embodiment of the present invention in which separate solid materials, binder solution and foamable solution are input to a mixer.
Figures 3, 4:
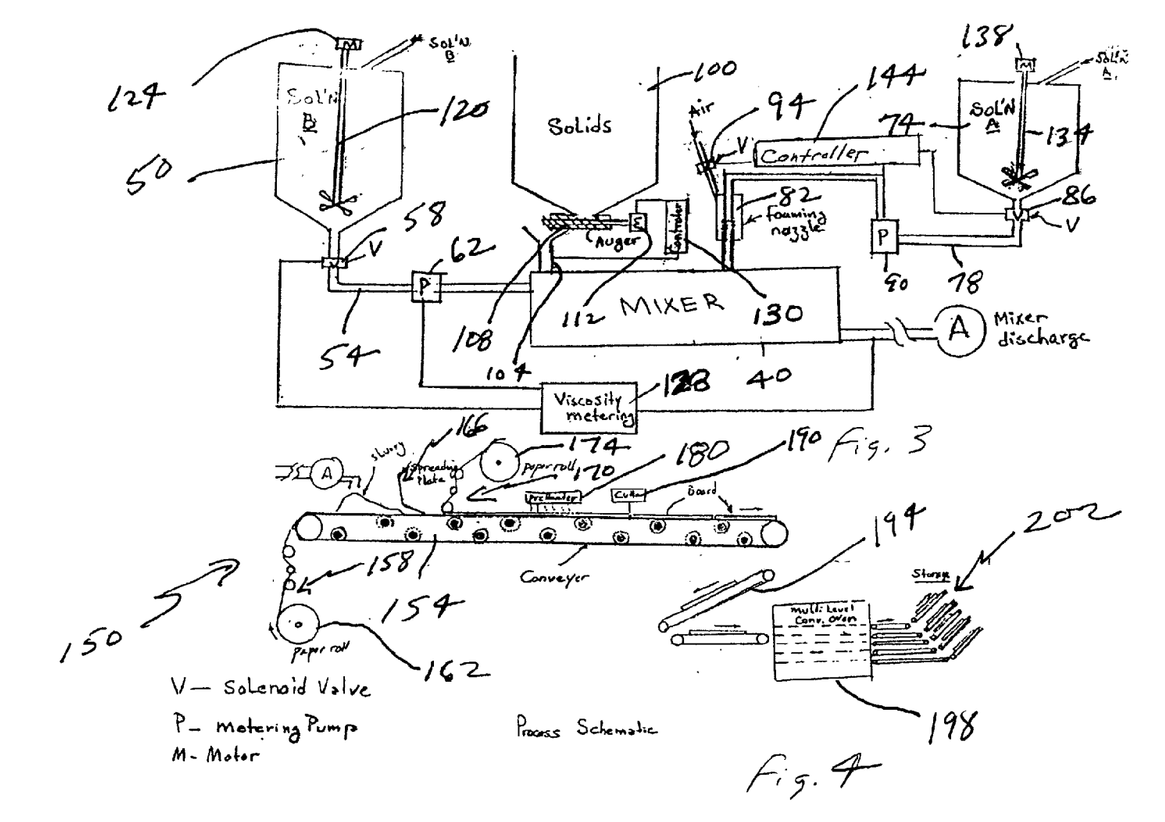
FIG. 3 schematically illustrates a composition forming subsystem.
FIG. 4 schematically illustrates a wallboard forming subsystem.

With reference to FIGS. 2 and 3, more details are next described related to the processing or making of the composition to be located between the two outer members, such as the relatively rigid paper products. As illustrated in the embodiment of FIG. 2, three vessels or bins are included for obtaining the different materials from which the composition is made. Thus, according to this embodiment, two different vessels are provided for a binder solution and a foamable solution instead of, for example, one vessel that constitutes all of the necessary foamable material and binder material. The binder solution vessel 50 contains the previously described binder solution including the binder material and water. The output of the binder solution vessel 50 eventually communicates with the mixer 40 using a first conduit or other material carrying line or channel 54. Intermediate the mixer 40 and the binder solution vessel 50, a first valve device (VD1) 58 and a first pump mechanism (PM1) 62 can be disposed. The first valve device 58 can be used to control the amount of binder solution output from the binder solution vessel 50 and which is to be carried by the first conduit 54 downstream of the first valve device 58. The first pump mechanism (PM1) 62 can be included to pump or otherwise cause movement of the binder solution along the first conduit 54. In this illustrated embodiment, operations associated with the first valve device 58 and the first pump mechanism 62 are controlled by the control system 70 that can include appropriate hardware and software including at least one processor involved with processing input data or other information related to controlling the operation of the first valve device 58 and/or the first pump mechanism 62. In that regard, in one embodiment, the control system 70 can include a transducer or other sensor involved with monitoring the output of the mixer 40. For example, the control system 70 monitors the viscosity of the composition output by the mixer 40. Based on the value or magnitude of the viscosity that is detected or determined, the control system 70 regulates the opening/closing of the first valve device 58 and/or the pumping function of the first pump mechanism 62, one or both of which may be variably controlled. Hence, the amount of the binder solution from the vessel 50 can be controlled, particularly related to the amount that is input to the mixer 40 at any particular time interval.

The foamable solution vessel 74 houses the foamable solution as previously described including, in one embodiment, a foaming agent and/or second binder material that can be the same as the first binder material. A second conduit 78 carries and ultimately outputs the foamable solution into the mixer 40. In the illustrated embodiment, a foaming nozzle 82 is positioned along the second conduit 78 upstream of the mixer 40. The foaming nozzle 82 functions or contributes to the foaming of the foamable solution so that a foam material is received by the mixer 40. Like the binder solution vessel 50, a second valve device (VD2) 86 and a second pumping mechanism (PM2) 90 can be located intermediate the foaming solution vessel 74 and the mixer 40, each of which can be involved in controlling the flow of the foamable solution. As illustrated in this embodiment, the control system 70 also can regulate the opening/closing of the second valve device (VD2) 86 and can control the activation/de-activation of the second pump mechanism (PM2) 90. The control system 70 can be programmed or otherwise designed to make determinations related to the flow and quantity of the foamable solution to be provided to the mixer 40 at any interval of time, such as based on viscosity of the output composition, which viscosity is a function of the amount of such materials that constitute the composition being formed in the mixer 40. Additionally, air can be introduced into the foaming nozzle 82 through a third valve device (VD2) 94, with the opening/closing thereof being regulated by the control system 70. As can be appreciated, the degree of foaming, which is a function of the introduced air, has an effect on the viscosity and density of the composition then being formed in the mixer 40.

A solids vessel 100 is provided for containing the fly ash and which can contain other solids such as the glass fiber previously noted. The output of the solids vessel 100 communicates with the mixer 40 by means of a third conduit or carrying line 104. Intermediate the solids vessel 100 and the mixer 40 can be a feed mechanism 108, such as an auger, including a motor 112 or other comparable device/mechanism that enables or facilitates movement of the solid material(s) along the third conduit 104. The motor 112 is an electrical communication with the control system 70 so that the control system 70 can activate/de-activate the feed mechanism 108 or even may be able to variably control the operation or movement of the feed mechanism 108 so that it operates somewhere between maximum movement and no movement (when no solids are caused to be carried from the solids vessel 100 to the mixer 40).

A similar and related embodiment of a composition forming subsystem is depicted in FIG. 3. The binder solution vessel 50 can have a first mixing mechanism 120 that includes a motor 124. The first mixing mechanism 120 can assist in providing the necessary composition output by the mixer 40 by insuring that the binder solution has a uniform or homogeneous mixture of the first binder and the water. The binder solution vessel 50 can include a solution input line to facilitate the entry or input of the binder solution to the binder solution vessel 50. Activation of the motor 124 can be conducted manually or automatically, such as under control of the control system 70 or a separate controller.

In this embodiment, the first valve device 58 and the first pump mechanism 62 are controlled by a viscosity metering unit 128 that monitors the viscosity of the composition at the output of the mixer 40. Accordingly, the viscosity metering unit 128 detects the viscosity in the current composition being output by the mixer 40. Based on this determination, the viscosity metering unit 128 controls one or both of the outputs from the first valve device 50 and the first pump mechanism 62.

With respect to controlling the output of the solid material (s) from the solids vessel 100, the motor 112 of the feed mechanism 108 can be activated/de-activated or variably controlled using a separate first controller 130 that is electrically connected to the motor 112. The first controller 130, which could also be controlled by the control system 70, is also operably connected to or otherwise operatively associated with a sensing of the solids being output from the solids vessel 100. Appropriate control algorithms can be devised by which the amount of solids that are sensed as currently being in the third conduit 104 can be used to control the output of the controller 130 that is applied to the motor 112.

The foamable solution vessel 74 can also have a second mixing mechanism 134 that includes a motor 138. Like the first mixing mechanism 120, the second mixing mechanism 134 can be used to insure a proper mixture of the second binder and water to provide a desirable homogeneous solution. The second valve device 86, the second pump mechanism 90 and the third valve device 94 provided along the second conduit 78 can be manually controlled or automatically or semi-automatically controlled using a separate second controller 144, which could also be controlled by the control system 70. The control inputs to these valves and pump mechanism can thereby be determined based on desired or predetermined parameters that are taken into account by the second controller 144 and/or the control system 70. In that regard, the viscosity metering unit 128, the first controller 130, the second controller 144 and/or the control system 70 may be able to communicate with each other in connection with making the determinations regarding the activations or states of the various controlled units including valves, pump mechanisms and feed mechanism.

Referring now to FIG. 4, the next description relates to the wallboard forming subsystem 24. The composition output from the mixer 40 is subsequently received by the wallboard forming subsystem 24 in the form of a slurry. In connection with receiving the composition slurry, the wallboard forming subsystem 24 can include a conveyor assembly 150 that can include at least a first conveyor 154 that moves at a controlled rate or line speed, which can be a function of the setting time of the composition core of the wallboard, i.e., how quickly the composition becomes sufficiently set or hardens so that it can be properly subject to a later cutting or severing action. The composition slurry is positioned or allowed to be located on the first conveyor 154 along a portion thereof. Located beneath the composition is a first outer or lower piece or member constituting an outer part of the wallboard. The lower member can be formed by a paper product that is provided adjacent to the first conveyor 154 using a paper roll mechanism that can include a main roll unit 162 from which the paper product is unrolled using a number or series of rollers that guide and/or transport the lower member to the first conveyor 158. The composition slurry is overlaid thereon as the first conveyor 154 is caused to move. In the usual wallboard manufacturing process, the wallboard sides or edges are crimped or tapered. In conjunction with such tapering, a composition similar to the composition slurry is utilized but has a different viscosity and density, typically lower than the viscosity and higher than the density of the composition slurry provided on the main portions of the paper product. This lower viscosity and higher density composition can be applied at essentially the same time the composition slurry is provided on the paper product. This lower viscosity and higher density composition still has a viscosity and density in the previously described viscosity range of 600,000–1,500,000 centipoise and density range of 0.58–0.79 (grams/ml).

A subsequent stage associated with the wallboard forming subsystem 24 can include a slurry spreading mechanism 166 that might include a plate or other piece that is involved with smoothing, reducing the thickness or otherwise spreading the composition as it moves relative to the spreading mechanism 166. A further stage associated with the wallboard forming subsystem 24 is an upper member mechanism 170 that is used to provide the second outer or upper member of the wallboard. The upper member can move from the upper member holding or unrolling device 174 by means of a series of rollers or like members to the first conveyor 154 until the upper member is positioned over the reduced-in-thickness composition thereby providing the completed parts of the wallboard, namely, the composition sandwiched by the upper and lower members. With respect to locating the upper member so that it overlies the composition, as this occurs, or just before it occurs, the edges of the lower member form upward and around the composition and reach a section where the upper member is placed on top of the composition. Immediately before this, both edges of the upper member are brushed with an adhesive solution so that the edges of the upper and lower members are adhered and pressed together. This results in a sealing of the composition sandwiched between the two outer members. As part of this stage before heating, the formed wallboard can also be subjected to a pressure or force related to achieving the desired or predetermined wallboard thickness.

The wallboard forming subsystem 24 can also include a preheater assembly 180 that provides desired heating and raises the temperature of the wallboard composition and the two wallboard members. The preheater assembly 180 functions to cause water portions of the wallboard composition to evaporate. Relatedly, because of such preheating, it is necessary that such water be removed while maintaining sufficient bubbles or cells to achieve proper density of the composition and in the wallboard product. In that regard, at least the first binder material must have the property that, when forming the bubbles or cells, it provides sufficiently strong or thick bubbles or cells such that a suitable number of them do not unwantedly diminish in size or burst, such as at least a majority of such bubbles or cells remain after the preheating. It has been determined that a first binder having the appropriate amount of polyvinyl alcohol (PVA) has this property, while polyvinyl acetate products do not.

The wallboard forming subsystem 24 also includes a cutting assembly 190 located along or operatively associated with the first conveyor 154. In the preferred embodiment, the cutting assembly 190 is provided downstream of the preheater assembly 180 so that the wallboard is formed into a plurality of wallboards of a desired size after preheating of the wallboard whereby the composition is set or sufficiently hardened to allow for satisfactory cutting. After cutting, each of the plurality of wallboards can be carried along the first conveyor 154 for suitable handling. In one embodiment, each of the plurality of wallboards is conveyed to a second conveyor 194 of the conveyor assembly 150. The second conveyor 194 is arranged to preferably convey the plurality of wallboards to a multi-level oven 198. The oven 198 can be a convection-heated oven that dries each of the formed wallboards, as they move through the oven 198 at a predetermined speed, such as by means of a further conveyor, with each being sufficiently dried as it moves through the oven 198. After being dried, the plurality of wallboards can be moved to storage 202.

With regard to the composition slurry provided to the first conveyor 154 having the desired properties, such as a viscosity within a predetermined range, it may be appropriate that such a composition be made according to a batch process. That is, the mixer 40 might receive the foamed solution output by the foaming nozzle 82 and the binder solution from the first conduit 54, without solids being input to the mixer 40 from the solids vessel 100. Accordingly, these two solutions are homogeneously or otherwise desirably mixed together before the solids including at least the fly ash are added in the mixer 40. Then, the composition being mixed in the mixer 40 would be properly combined and then utilized in making the wallboard. After the mixer is emptied or substantially emptied of this composition batch, then another batch could be made in which the binder solution and foam solution are mixed firstly before adding the fly ash.

Alternatively or additionally, parameters different from the viscosity of the composition could be monitored during the making of the wallboard. By way of example, the temperature associated with the preheater assembly 180 and/or the oven 198 might be monitored related to controlling the output of the mixer 40. The time involved with at least certain of the processing steps or stages could also be monitored in controlling the output of the mixer 40. The pressure or other force involved with achieving a desired wallboard thickness could be checked and adjusted depending on what desired results are sought. Essentially empirical data might be gathered related to making the wallboard by which it was observed or determined that wallboard of the predetermined or expected density, strength and/or homogeneity is achieved under certain conditions and then controlling such conditions so that subsequent wallboards have the same or substantially the same density, strength and/or homogeneity. Such conditions might relate to the amounts of binder solution, foam solution and/or solid material(s) that are provided to the mixer 40 for a particular batch of composition or which composition results in a number of wallboards being serially made or made close in time.

Although the wallboard composition subsystem 20 and the wallboard forming subsystem 24 might be constructed or otherwise implemented at any of a number of desirable locations, in one embodiment, they are essentially integrated at a plant or facility which generates substantial quantities of fly ash, such as a coal burning plant. The fly ash produced at the plant can be directly moved or input to the solid material(s) vessel 100. This embodiment eliminates the need for substantial transport of the fly ash thereby resulting in anticipated cost savings.

The foregoing description of the inventions has been presented for purposes of illustration and discussion. Further, the description is not intended to limit the inventions to the form disclosed herein. Consequently, further variations and modifications commensurate with above teachings, within the skill and knowledge of the relevant art, are within the scope of the present invention. The embodiments discussed hereinabove are also intended to explain the best modes known of practicing the inventions and to enable others skilled in the art to utilize the inventions in such, or in other embodiments, and with the various modifications required by the particular applications or uses of the inventions. It is intended that the appended claims be construed to include alternative embodiments to the extent permitted by the prior art.

What is claimed is:

1. A wallboard, comprising:
   a first member;
   a second member; and
   a composition disposed between said first and second members, wherein said composition is made using at least:
   (a) fly ash in the range of about 60%–66% by weight;
   (b) water in the range of about 31%–37% by weight; and
   (c) at least a first binder in the range of about 1.8%–2.4% by weight.

2. A wallboard, as claimed in claim 1, wherein:
said composition has a second binder that is part of a foamable solution that includes portions of said water and said second binder being one of: compatible with and equivalent to said first binder.

3. A wallboard, as claimed in claim 1, wherein:
portions of said water and said at least first binder are provided in a binder solution and remaining portions of said water and a second binder that is one of: compatible with and equivalent to said first binder are provided as part of a foamable solution.

4. A wallboard, as claimed in claim 1, wherein:
said composition includes a fiber material that is less than 1% by weight of sid compostion.

5. A wallboard, as claimed in claim 1, wherein:
said at least first binder is different from polyvinyl acetate.

6. A wallboard as claimed in claim 1, wherein:
said composition when made consists essentially of said fly ash, a binder solution that includes parts of said water and parts of said at least first binder and a foamable solution that includes remaining portions of said water and remaining portions of said at least first binder.

7. A wallboard, as claimed in claim 1, wherein:
said wallboard has a nail pull strength of between about 80.0 to 130.0 (lbs.) and a density between about 0.58 to 0.79 (gm/ml).

8. A wallboard, as claimed in claim 1, wherein:
said composition has a viscosity in the range of about 600,000 to 1,500,000 centipoise when said composition is initially disposed between said first and second members.

9. A method for making wallboard, comprising:
combining at least fly ash, water and at least a first binder to provide a composition having a viscosity, said fly ash being in the range of about 60%–66% by weight, said water being in the range of about 31%–37% by weight and said at least first binder being in the range of about 1.8%–2.4% by weight; and
joining first and second members to upper and lower portions of said composition when said viscosity is at least about 600,000 centipoise.

10. A method, as claimed in claim 9, wherein:
said at least first binder is part of a binder solution that includes at least portions of said water and remaining portions of said water being part of a foamable substance and in which said foamable substance includes a second binder that is one of: compatible with and equivalent said first binder.

11. A method, as claimed in claim 10, wherein:
each of said first binder and said second binder is different from polyvinyl acetate and includes polyvinyl alcohol.

12. A method, as claimed in claim 9, wherein:
at least portions of said at least first binder are part of a binder solution with first portions of said water and remaining portions of said at least first binder are part of a foamable solution with second portions of said water and said combining step includes introducing separately each of said fly ash, said binder solution and said foamable solution to a mixer.

13. A method, as claimed in claim 9, wherein:
said joining step includes locating said first member on a conveyor and receiving portions of said composition in a slurry on said first member and subsequently locating said second member on said portions of said composition.

14. A method, as claimed in claim 9, wherein:
said combining step includes monitoring viscosity of said composition output from a mixer.

15. A method, as claimed in claim 9, wherein:
after said joining step, said composition is essentially homogenous in that, for each cross-section thereof, an area of 0.1 square inch is essentially the same as any other area of 0.1 square inch.

16. A method, as claimed in claim 9, wherein:
said combining step includes introducing fibers to said composition in an amount less than 1% by weight.

17. A method, as claimed in claim 9, wherein:
said combining step includes controlling using a control system at least one of a first pump mechanism and a first valve device in communication with at least a first vessel containing at least some of said at least first binder.

18. A method, as claimed in claim 17, wherein:
said combining step includes outputting a desired amount of said fly ash from a second vessel containing at least said fly ash using said control system.

19. A method, as claimed in claim 18, wherein:
said combining step includes regulating production of a foamable substance that includes at least some of said water using said control system and at least one of a second valve device and a second pump mechanism.

20. A method for making wallboard, comprising:
combining at least fly ash in the range of about 60%–66% by weight, water in the range of about 31%–37% by weight and at least a first binder in the range of about 1.8%–2.4% by weight to provide a composition having a viscosity; and
joining first and second members to upper and lower portions of said composition.

21. A method for making wallboard, comprising:
combining at least fly ash, water and at least first portions of a first binder in providing a composition having a viscosity;
monitoring said viscosity of said composition;
controlling based on said monitored viscosity at least one of a first pump mechanism and a first valve device in communication with at least a first vessel containing at least second portions of said at least first binder before said at least second portions are combined with at least said fly ash; and
joining first and second members to upper and lower portions of said composition.

22. A method, as claimed in claim 21, wherein:
said controlling includes using a control system to control said at least one of said first pump mechanism and said first valve device.

* * * * *